United States Patent [19]

Perrin

[11] 4,119,069
[45] Oct. 10, 1978

[54] ELECTRONIC IGNITION WITH ANGULAR TRANSCODER

[76] Inventor: Jean-Claude Perrin, Domaine de la Quietude No. 13, 06800 Cagnes sur mer, France

[21] Appl. No.: 737,458

[22] Filed: Nov. 1, 1976

[51] Int. Cl.² ............................. F02P 5/04; F02B 3/00
[52] U.S. Cl. ........................... 123/117 D; 123/32 EC; 123/32 EB; 364/431
[58] Field of Search ......... 123/32 EC, 32 EB, 117 R, 123/117 D; 235/150.20, 150.21

[56] References Cited

U.S. PATENT DOCUMENTS

| 3,903,857 | 9/1975  | Hönig et al.     | 123/117 D |
| 3,919,987 | 11/1975 | Haubner et al.   | 123/117 D |
| 3,927,304 | 12/1975 | Wentworth et al. | 123/32 EC |
| 3,946,709 | 3/1976  | Monpetit         | 123/117 D |
| 3,998,193 | 12/1976 | Ives et al.      | 123/117 D |
| 4,034,719 | 7/1977  | Monpetit         | 123/32 EB |

FOREIGN PATENT DOCUMENTS 2,293,599  2/1976  France ........................ 123/32 EC Primary Examiner—Charles J. Myhre
Assistant Examiner—P. S. Lall
Attorney, Agent, or Firm—Richard L. Donaldson; James T. Comfort; Rene' Grossman

[57] ABSTRACT

A time base generator is adapted to deliver a first and a second clock signal whose frequencies are fixed and in a ratio equal to a predetermined multiple. A forward counter counts the number of pulses of the second clock signal produced between two successive pulses of an input signal. A first buffer memory stores that number during the next counting period of the forward counter. A backward counter counts down number stored in the buffer memory in synchronism with the first clock signal. A first gate produces an output pulse at the end of each count-down of said number by the backward counter and applies that output pulse to the backward counter to control a new countdown of said number. By using as input signal the signal of a pick-up delivering one pulse per revolution of a rotating member, one obtains an angular coding of the rotation of this member. The apparatus may be used for controlling the ignition advance angle of an internal combustion engine.

8 Claims, 7 Drawing Figures

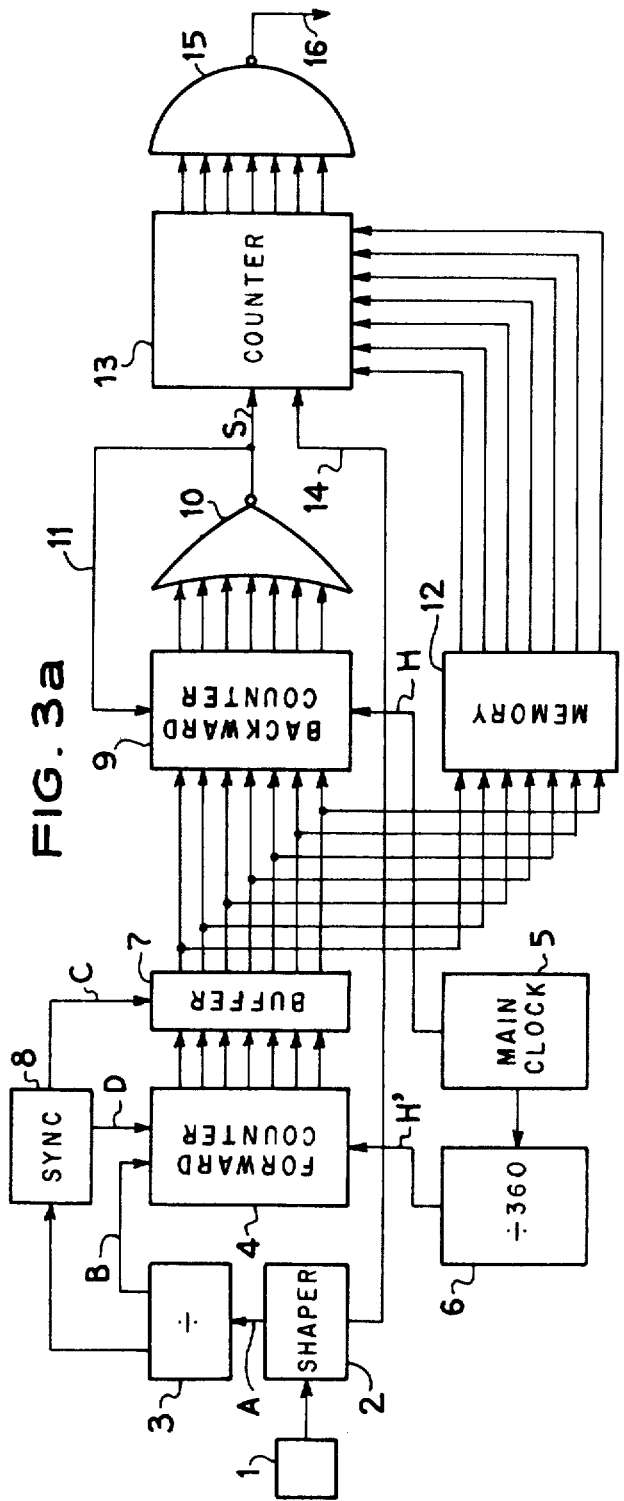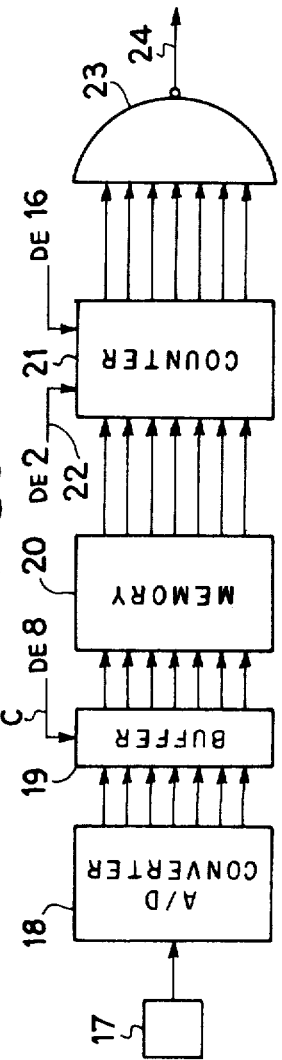

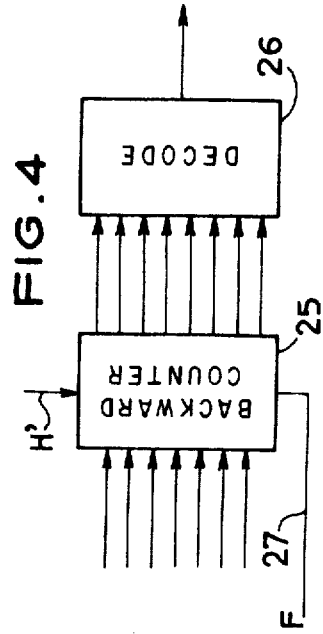
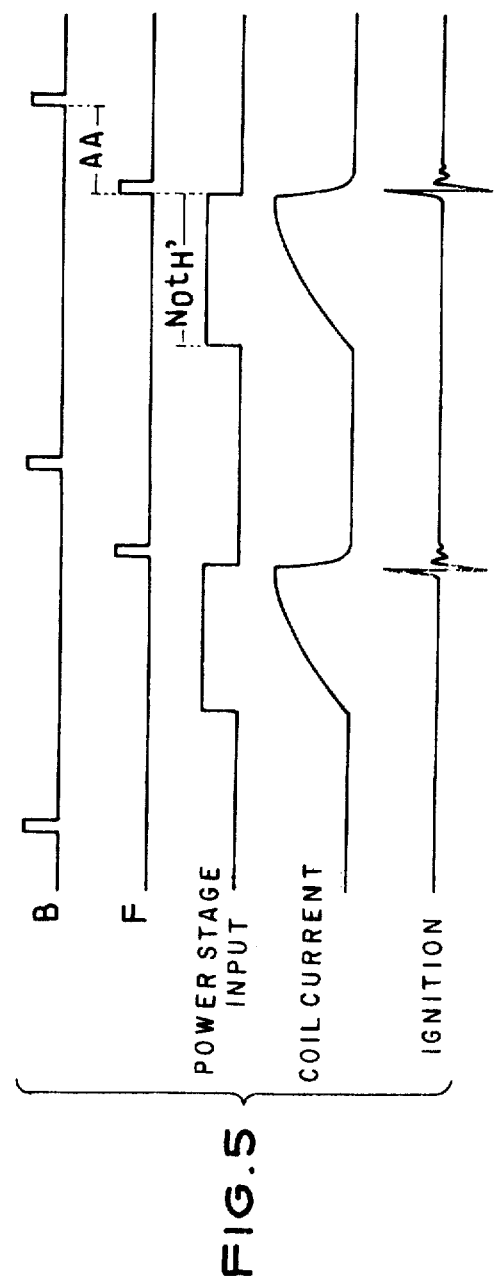

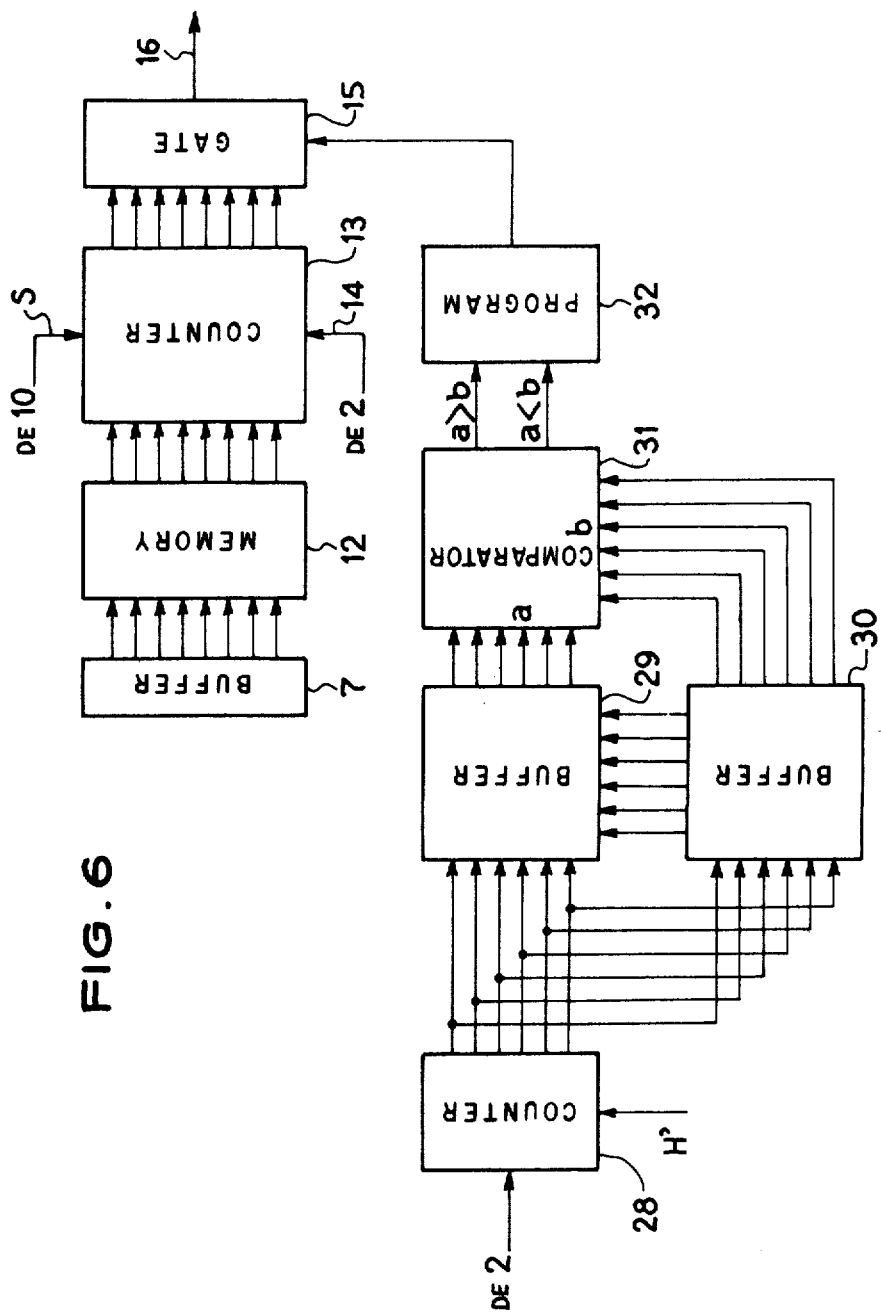

ELECTRONIC IGNITION WITH ANGULAR TRANSCODER

The present invention concerns apparatus for angular coding of a rotating member and suitable for application to ignition control of internal combustion engines.

An object of the invention is to realize apparatus which permits production of an output signal whose frequency is a fixed multiple of the frequency of a pulsed input signal.

To this end, the invention provides a time base generator adapted to deliver a first and a second clock signal whose frequencies are fixed and in a ratio equal to the fixed multiple, a first counter which counts the number of pulses of the second clock signal produced between two successive pulses of the input signal, a first buffer memory for storing the counted number during the next counting period of the counter, a first backward counter for counting down the number stored in the buffer memory in synchronism with the first clock signal, and a first gate to produce an output pulse at the end of each count-down of said number by the first backward counter and to apply the output pulse to the backward counter to control a new count-down of said number.

One embodiment of the invention comprises apparatus for delivering clock pulses corresponding to successive substantially equidistant angular positions of a rotating member. This embodiment comprises apparatus as described in the preceding paragraph, a speed pickup to detect at each revolution of the rotating member its passage through at least one prodetermined angular position and to deliver a pulse in response to said passage, and means for delivering said input signal in response to the pulses produced by the pickup, said means being adapted to impart to said input signal a period equal to the period of rotation of said member so that the pulses of said output signal represent said successive angular positions of this member and that the ratio between one revolution of said member and the angular distance separating two of said successive positions is equal to said multiple.

In another embodiment of the invention, the ignition advance angle of an internal combustion engine is controlled as a function of the speed of the engine, without actual calculation of engine speed. The speed pick-up described above is adapted to deliver a pulse at each passage of a piston through the upper dead center, a first read-only memory programmed to deliver, as a function of said number, representative of the speed of the engine, stored in the first buffer memory, a number representative of the ignition advance angle of said engine for said speed, a second counter which, upon command of the signal delivered by the forming stage, is loaded with said number delivered by said first read-only memory and which, from said number with which it is charged, counts the pulses of said output signal delivered by the first gate up to a predetermined count value representative of the angular distance separating the consecutive passages of two pistons through the upper dead center, and a second gate adapted to deliver an ignition signal when said second counter has reached said predetermined count value.

In yet a further embodiment of the invention, the ignition advance angle of an internal combustion engine is controlled as a function of engine speed and engine loading. The speed pickup is adapted to deliver a pulse at each passage of a piston through the upper dead center, a first read-only memory programmed, to deliver, as a function of said number, representative of the speed of the engine, stored in the first buffer memory, a number representative of a portion of the ignition advance angle of the engine for said speed, a second counter which, upon command of pulses corresponding to the pickup pulses is loaded with said number delivered by said first read-only memory and which, from said number with which it is loaded, counts the pulses of said output signal delivered by the first gate up to a predetermined count value representative of a first given fraction of the angular distance separating the consecutive passages of two pistons through the upper dead center, a second gate adapted to deliver a signal when said second counter has reached said predetermined count value, a pressure pick-up adapted to deliver a signal representative of the loading of the engine, a converter device for delivering a pulsed signal whose number of pulses is proportional to said output signal of the pressure pick-up, a second buffer memory for storing said number at the output of the converter device, a second read-only memory programmed to deliver, as a function of said number, representative of the loading of the engine, stored in the second buffer memory, a number representative of a portion of the ignition advance angle of the engine for said loading, the sum of said numbers delivered by the first and second static memories representing the total ignition advance angle, a third counter which, upon command of pulses corresponding to the speed pick-up pulses, is loaded with said number delivered by the second read-only memory and which, upon command of the signal delivered by the second gate, counts, from said number with which it is loaded, the pulses of said output signal delivered by the first gate across the second gate up to a predetermined count value representative of a second given fraction of the angular distance separating said consecutive passages of two pistons through the upper dead center, the sum of said first fraction and of said second fraction being equal to said angular distance, and a third gate adapted to deliver an ignition signal when said third counter has reached its predetermined count value.

Other characteristics and advantages of the invention will become evident in the course of the following description, made in reference to the accompanying drawings, given solely by way of example and in which:

FIGS. 3a and 3b are schematic diagrams of a circuit for controlling the ignition advance angle of an i.c. engine as a function of the apeed and charge thereof;

FIG. 4. is a diagram showing of a constant energy ignition circuit;

FIG. 5 shows a series of signals, the last of which are the ignition signals;

FIG. 6 represents a variant of the device of FIG. 3a applied to an asymmetric engine.

Figure 1:
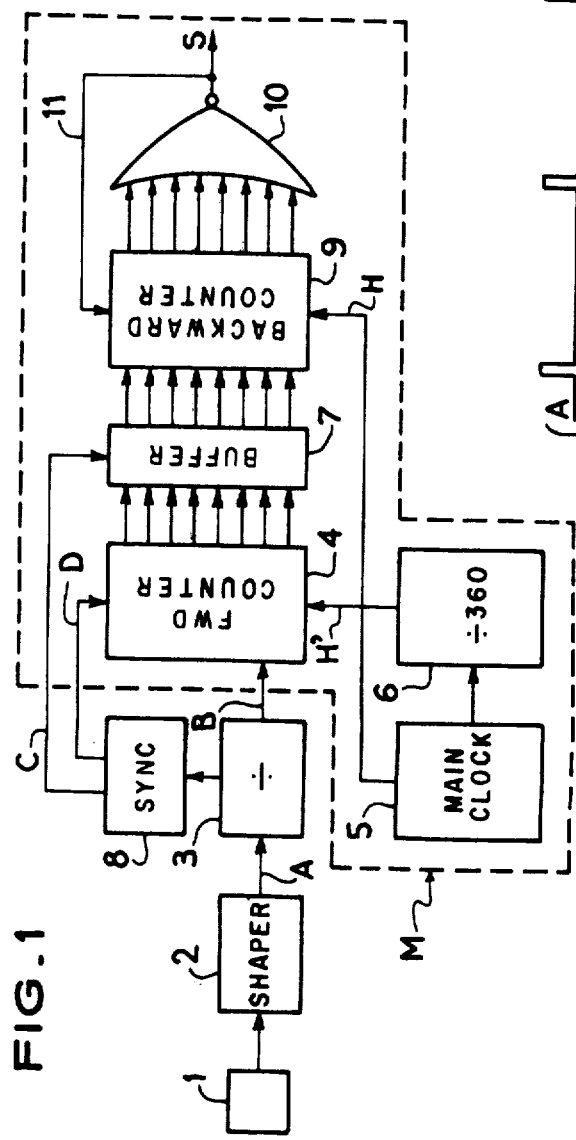
FIG. 1 is an overall diagram of a device for angular coding of the movement of a rotating member, incorporating a frequency multiplier embodying the invention.
Figure 2:
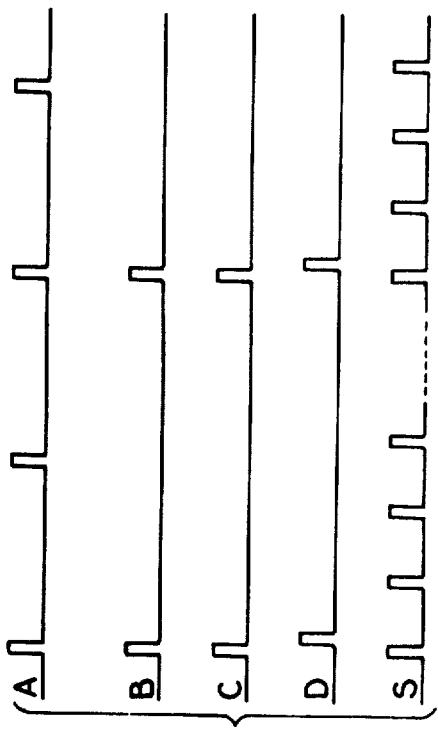
FIG. 2 shows a series of signals at different points of the device of FIG. 1.

Referring to FIGS. 1 and 2, the angular coding device, hereafter called an angular clock, includes a pick-up 1 intended to deliver a signal at each passage of a rotating member through a determined position. In view of the application which will be described below of this angular coding device to the processing of the ignition advance angle of an engine, it will be considered that the rotating member is formed by the crankshaft of a four cylinder internal combustion engine and that the pick-up delivers two pulses offset by 180° per crankshaft revolution, each pulse corresponding to the passage of a piston through the upper dead center. However, it must be understood that the angular coding device could be used to code angularly the rotation of any other rotating member.

The output signal of the pick-up 1 is applied to the input of a pulse shaper 2 whose signal at the output A is applied to a divider 3 which divides the frequency of the signal A by two. In the case of a six cylinder engine, the pick-up would be adapted to deliver three pulses offset by 120° at each engine revolution, and the signal of the pick-up should be divided by 3. Similarly, in an eight cylinder engine there would be 4 pulses per engine revolution and the signal of the pick-up would be divided by 4. In this manner, whatever the type of engine, the divider 3 produces a pulse (signal B) at each engine revolution and the pulse shaper 2 a pulse (signal A) at each passage of a piston through the upper dead center.

The output signal B of divider 3 constitutes the input signal of a frequency multiplier M which comprises a time base formed by a main clock 5 delivering a first clock signal H of fixed frequency $F_H$ and a divider 6 delivering a first clock signal H' of fixed frequency $F_{H'}$ such that $F_H = 360 F_{H'}$.

The signal B is used to return to zero a counter 4 which counts the pulses of the second clock signal H'.

Between two pulses of the output signal B of the divider, the counter 4 counts the number $N_1$ of pulses of the second clock signal H' and this number $N_1$ is transferred into a buffer memory 7 on the command of a synchronization signal C produced by a synchronization circuit 8 coupled to the divider 3. This synchronization circuit 8 also produces a second synchronization signal D of the same frequency as the signal C but presenting a selected delay relative to the latter and initiating the counting of counter 4 after its content has been transferred into the buffer memory 7.

The content $N_1$ of the buffer memory 7 is counted down by a backward counter 9 which operates at the frequency $F_H$, for example of the order of from 1MHz to 4MHz, of the first signal H of the main clock 5. The outputs of the backward counter 9 are connected to a gate 10 which delivers a pulse every time all outputs of the backward counter 9 are at zero. This pulse is then applied via a line 11 to the backward counter 9 to bring all its outputs back to "N" and the latter then restarts to count down the number $N_1$ in synchronism with the first clock signal H.

If we call T the counting time for the counter 4, which is also the period of rotation of the engine, and $t_{H'}$ the period of the second clock signal, we have: $T = N_1 t_{H'}$.

Likewise, the time $t$ which passes between two zero crossings of the backward counter 9 is $$t = N_1 t_H$$

where $t_H$ is the period of the first clock signal.

The ratio of the count-down time to the counting time is:

$$\tau = t/T = \frac{N_1 t_H}{N_1 t_{H'}} = t_H/t_{H'} = 1/360$$

Consequently, gate 10 delivers a pulse every 360th of an engine revolution, that is, at each degree of rotation of the crankshaft, regardless of the speed of the engine.

Naturally, an angular coding other than in degrees could be realized. It would suffice for this to suitably modify the ratio between the frequency of the first clock signal and that of the second clock signal.

On the other hand, in cases where it is not necessary to mark the passage of the rotating member through a particular intermediate position of its rotation and where the speed pick-up simply delivers one pulse at each revolution of this member, the divider 3 may be omitted. The output signal A of the forming stage is then applied directly to the counter 4 and controls also the synchronization circuit 8.

Lastly, the device M which comprises the time base device 5, 6, the counter 4, the buffer memory 7, the backward counter 9, the gate 10 and suitable synchronization means (not shown) may be applied to the multiplication of the frequency of any input signal G and is not limited to the described application of the angular coding of the rotation of a rotating member.

FIG. 3a shows the application of an angular coding device embodying the invention to a circuit for controlling the ignition advance angle AA of an engine as a function of the engine speed.

This circuit comprises an angular coding device identical with that of FIG. 1, a read only memory (ROM) 12 whose inputs are connected to the respective outputs of the buffer memory 7 and whose outputs are connected to a counter 13 which receives also the output signal S of gate 10 and a synchronization signal applied to it via the pulse shaper 2 through a conductor 14. Lastly, the outputs of counter 13 are connected to NAND gate 15 whose output 16 controls the ignition of the engine.

The content of the ROM 12 is individual to each type of engine, that is to say that in this memory 12 there is inscribed in digital form the characteristic curve of the ignition advance angle for the engine in question as a function of the speed of the engine. Thus, at each loading of the buffer memory 7 whose content $N_1$ is representative of the speed of the engine, the ROM 12 reads the number $N_1$ and produces at the output a value $N_\nu$ which corresponds to the predetermined ignition advance angle for the speed "$N_1$" of the engine. This value $N_\nu$ is entered into the counter 13 which starts to count the angular output pulses of the gate 10 on the command of the synchronization signal applied to it by the pulse shaper 2 at each passage of a piston through the upper dead center position. In the case of a four cylinder engine, this counter is adapted to count only to 180. As the number $N_\nu$ has previously been entered into the counter 13, when its count reached 180, it has in reality counted $180 - N_\nu$ output pulses of the gate 10, that is $(180 - N_\nu)$ degrees. Gate 15 then delivers an output signal which, consequently, appears $N_\nu$ degrees in advance in relation to the upper dead center. This signal at output 16 of gate 15 can be applied, for example, to a transistor arranged in the circuit of the ignition coil to control the blocking thereof and thus to assure the discharge of the coil, this discharge being routed by conventional means, known per se, to the appropriate cylinder. Of course, the output signal of gate 15 can be used to control any other type of ignition device of an engine.

When counter 13 has counted to 180, it remains in that state until it receives a synchronization signal from the pulse shaper 2, which signal corresponds to the passage of a piston through the upper dead center. Returned to zero, the counter 13 reads the new number N', produced at the output of the ROM 12, restarts to count the angular output pulses of gate 10 until it reaches the count 180, then causes the delivery of an output signal N', degrees in advance relative to the upper dead center through the gate 15, then a new cycle begins, and so forth.

It will be noted that the speed of the engine, represented by the number $N_1$, is measured during one engine revolution and that this indication of the speed is used to cause two ignitions during the next revolution. However, this very small time shift has in reality no practical effect whatever because the speed of an engine varies insignificantly from one revolution to the next.

FIG. 3b shows a circuit combined with that of FIG. 3a to realize a system for controlling the ignition advance angle of an engine as a function of engine speed and engine load. This circuit of FIG. 3b includes a pressure pick-up 17 which delivers a voltage proportional to the air pressure at the level of the air intake of the engine. The output signal of the pick-up 17 is applied to a converter 18 which may be an analog-digital converter or an oscillator (V.C.O.) whose frequency is a function of the voltage. The converter 18 enters into a buffer memory 19 a number proportional to the engine loading and the outputs of this buffer memory are connected to the inputs of a ROM 20 adapted, in a manner similar to the ROM 12, to produce at its output a value which depends on the engine loading represented by the number contained in the buffer memory 19.

In the case of this circuit for controlling the ignition advance angle as a function both of the speed and load, the memories 12 and 20 each contain respectively a portion $n_v$ and a portion $n_p$ of the ignition advance angle such that the sum $n_v + n_p$ represents the total ignition advance angle of the engine for the particular speed and load sensed.

The outputs of the memory 20 are connected to a counter 21 which receives also the output signal 16 of gate 15 and a synchronization signal from the pulse shaper 2 via a conductor 22. Lastly, the outputs of counter 21 are connected to a NAND gate 23 whose output 24 is that of the circuit as a whole.

The counters 13 and 21 are adapted to count together at most to 180. In the following description of the operation of the circuit of FIG. 3a and 3b, it will be considered that each of these counters 13 and 21 can count at most to 90. This operation comprises first of all that of the circuit of FIG. 3a which has been described above and which will not be repeated. It will be noted, however, that counter 13 can count at the maximum to 90 and that, consequently, the gate 15 delivers a signal on its output 16 $(90 - n_v)$ degrees after the passage of the cylinder at the upper dead center, $n_v$ representing only a portion of the ignition advance angle.

At each upper dead center, the synchronization signal applied by the conductor 22 controls the entry of a portion $n_p$ of the ignition advance angle number produced by the memory 20 in the counter 21. This counter 21 starts its count only when it receives the output signal of gate 15, that is, when the counter 13 is brought to its maximum count. The counter 13 having attained this maximum, gate 15 transmits to counter 21 the angular pulses at the output S of gate 10 and the counter 21 counts in synchronism with these pulses up to its maximum count, here fixed at 90. When this maximum is attained, the gate 23 delivers a signal at its output 24 which thus occurs $(n_p + n_v)$ degrees in advance relative to the upper dead center. This output signal can be used to activate the ignition as described before in reference to FIG. 3a.

The maximum count of counter 13, in the case of the circuit of FIG. 3a considered alone, or of the counters 13 and 21 when the circuits of FIG. 3a and 3b are combined, must be equal to 180 angular pulses for a four cylinder engine. This maximum count must, of course, be 120 and 90 respectively in the case of 6 or 8 cylinder symmetrical engines. In the case of asymmetric engines, the value of this maximum count is different still.

FIGS. 4 and 5 represent respectively a constant energy ignition circuit that can be used with the circuits of FIG. 3a and/or 3b and the signals corresponding to this arrangement.

This circuit comprises a backward counter 25 whose inputs are connected to receive the respective outputs of the buffer memory 7, and a decoder 26 at the output of the backward counter 25. At each ignition point, one half the content of the buffer memory 7, that is, $N_1/2$, is entered into the backward counter 25. This content, of course, would be $N_1/3$ or $N_1/4$ in the case of symmetrical engines with six or eight cylinders. To this end, the output signal F of gate 15 or of gate 23, depending on whether the circuit of FIG. 4 is used with the circuit of FIG. 3a or with the circuit of FIGS. 3a and 3b, is applied by a conductor 27 to the backward counter 25 to cause this loading. The backward counter 25 then counts down its content $N_1/2$ while operating at the frequency $F_{H'}$ of the second clock signal H'. The decoder 26, in which is entered a number $N_o$ such that $N_o t_{H'}$ represents a predetermined charge time of the ignition coil, delivers an output signal when the backward counter 25 has counted down $((N_1/2) - N_o)$ pulses of the secondary clock signal. This signal can then be used to control the charge of the ignition coil by a power stage. The output signal of the gate 15 or of the gate 23 is then applied to this power stage to control the discharge of the coil. This discharge occurs 180° or $N_1/2$ pulses after the preceding ignition and, consequently, regardless of the speed of the engine, the power stage, whose input signal is represented in FIG. 5, charges the coil during the time $(N_1/2)t_{H'} - ((N_1/2) - N_o)t_{H'} = N_o t_{H'}$, that is, during a constant time since $N_o$ and $t_{H'}$ are constant. In this manner, the current cut off in the ignition coil by the power stage is always the same and the energy of the spark of the spark plugs remains constant.

FIG. 6 represents a complementary circuit of the circuit processing the ignition advance angle as a function of the speed represented in FIG. 3a and intended to be used with an asymmetrical engine. In an asymmetrical engine, the angular distance which separates the consecutive passages through the upper dead center of two pistons is not constant. Consequently, to determine the moment of commencement of the ignition, means must be provided for indicating whether the interval of time between the next two upper dead centers corresponds to a short or long duration.

This complementary circuit comprises a counter 28 adapted to count the number of pulses $n_1$ of the second clock signal H' appearing between the consecutive passages of two pistons through the upper dead center. To this end, the output signal of the pulse shaper 2 is applied to the counter 2 to reset it to zero and a synchronization signal is also applied to it by appropriate means (not shown) to cause the loading of the result of its count into buffer memories 29 and 30 and to permit it to count again. During the first interval separating the first two passages through the upper dead center, the counter 28 furnishes a result $n_1 = a$ pulses which is stored in the buffer memory 29. In the following interval, the counter 28 furnishes a different result $n_1 = b$ which is transferred into the buffer memory 30. A comparison circuit 31 compares the results $a$ and $b$, and as a function of the result of this comparison a programming device 32 controls the gate 15 which, in this form of realization, is a programmed gate. If the last number $b$ stored in the buffer memory 30 is greater than the number $a$ stored before, this indicates that the preceding interval was of long duration (large angular distance) and that the present interval is of short duration (small angular distance). In this case, the programming device 32 programs the gate 15 so that it delivers an ignition pulse when the counter has counted a predetermined number I of angular pulses corresponding to the smallest angular distance between two upper dead centers. The content $b$ of the buffer memory 30 is then transferred to the place of $a$ in the buffer memory 29 while the new result $a'$ of the count of counter 28 is loaded into the buffer memory 30. A new comparison takes place between $b$ and $a'$. If in the preceding comparison $b$ was greater than $a$, the new comparison will indicate that $a'$ is less than $b$. This indicates that the last interval had a short duration and hence that the present interval is of long duration. Consequently, the programming device 32 controls the gate 15 to deliver an ignition pulse when the counter has counted a predetermined number J of angular pulses corresponding to the greater angular distance between two upper dead centers, that is, that $J > I$. Then, the content $a'$ of the buffer memory 30 is transferred into the buffer memory 29 for a next comparison with the new result of the count of counter 28.

The angular coding device according to the invention could be used in other applications than the processing of the ignition advance angle of an internal combustion engine. Thus this device can be used whenever it is desired to measure or to regulate an angle on a rotating part e.g. engine adjustment bench; synchronization point of a stroboscope.

A suitable realization of the pressure pickup 17 is disclosed in copending application Ser. No. 737,459 filed Nov. 1, 1976 by Jean Cholet for SLAVED PRESSURE TRANSDUCER.

What is claimed is:

1. Apparatus for delivering utilization pulses corresponding to successive, substantially equidistant angular positions of a rotating member, comprising: speed pick-up means for detecting at each revolution of the rotating member its passage through at least one predetermined angular position and to deliver a pulse in response to said passage; means for delivering in response to the pulses produced by the pickup means input signals having a period equal to the period of rotation of said rotating member; time base generator means for delivering first and second clock signals whose frequencies are fixed and in a predetermined ratio; first counter means for counting the number of second clock signal pulses produced between two successive pulses of said input signal; first buffer memory means for storing said number during the next counting period of said first counter means; first backward counter means for counting down said number stored in the buffer memory means in synchronism with said first clock signal; first gate means for producing an output pulse at the end of each countdown of said number by the first backward counter means and to apply an input to said backward counter means for controlling a new count down of said number such that said output pulses represent successive angular positions of said rotating member and the ratio between one revolution of said rotating member and the angular distance separating two of said successive positions is equal to said predetermined ratio; first pre-programmed read-only memory means for storing a digitized code related to angular speed of said rotating member; said read-only memory means connected to receive as input said number stored by said buffer memory means and responsive thereto to produce a number dependent on said digitized code; second counter means operable under control of said input signals to receive said number representing said digitized code produced by said first read-only memory means and then to receive and count said output pulses from said first gate means up to a predetermined count value; and a second gate means for delivering said utilization signal when said second counter means has reached said predetermined count value.

2. Apparatus according to claim 1, wherein said input signal delivering means includes means for shaping pulses produced by said pick-up means.

3. Apparatus according to claim 2, wherein said pick-up means delivers a pulse at each revolution of said rotating member, said input signal comprising the pulses delivered by the pick-up and shaped by said shaping means.

4. Apparatus according to claim 1, wherein said pick-up means is adapted to deliver during each revolution of the rotating member a plurality of successive pulses corresponding respectively to predetermined angular positions of said rotating member, and said input signal delivering means comprises pulse shaper means for receiving said successive pulses and frequency divider means connected between said shaper means and said first counter means for delivering a said input signal of a period equal to the period of rotation of said member.

5. Apparatus for use in controlling the ignition advance angle of a multiple-piston internal combustion engine as a function of the speed of said engine, comprising: speed pick-up means for delivering a pulse at each passage of a poston of said engine through a corresponding predetermined position to produce a plurality of successive pulses corresponding respectively to predetermined angular positions during each engine revolution, pulse shaper means for receiving said successive pulses and frequency divider means connected between said shaper means and first counter means for supplying thereto input pulses having a period equal to the period of said engine rotation; time base generation means for generating first and second clock signals having respective frequencies fixed and in a predetermined ratio and for applying said second clock pulses to said first counter means to be counted during a counting period defined between two successive input pulses to produce a count representative of said engine speed; first buffer memory means for storing said number during the next counting period of said first counter means; first backward counter means for counting down said number stored in the buffer memory means in synchronism with said first clock signal; first gate means for producing an output pulse at the end of each countdown of said number by said first backward counter means and to apply an input pulse to said backward counter means for controlling a new count down of said number; first read-only memory means programmed to store a digitized representation of the ignition advance angle/engine speed characteristic of said engine, said read-only memory means connected to receive as input said number stored by said buffer memory means and responsive thereto to produce an output number representative of the corresponding ignition advance angle; second counter means operable under control of said input signals produced by said shaper means to receive said number representing ignition advance angle produced by the first read-only memory means and then to receive and count said output pulses from said first gate means up to a predetermined count value representative of the angular distance separating consecutive ones of said predetermined angular positions during said engine revolution; and a second gate means for delivering said ignition signal when said second counter means has reached said predetermined value.

6. Apparatus according to claim 5, including second backward counter means operable in response to said ignition signal to receive 2/n of the content of said first buffer memory means, where n is even and represents the number of cylinders of said engine, and then count down its content in synchronism with said second clock signal; decoder means connected to said second backward counter means for producing an ignition control signal when said second backward counter means has counted down its content minus a fixed predetermined number coded in said decoder means.

7. Apparatus according to claim 5, suitable for controlling the ignition advance angle of an asymmetrical engine wherein the angular distance between two upper dead centers is alternately large and small, comprising further counter means controlled by the output of said shaper means for counting the number of pulses of said second clock signal appearing between consecutive passages of two pistons through an upper dead center; third buffer memory means for initially receiving the first count of said fourth counter means; fourth buffer memory means for receiving the ensuing counts of said further counter means; means for transferring the contents of said fourth buffer memory means at each upper dead center into said third buffer memory means in place of the preceding content of said third buffer memory means; comparator means for comparing the contents of said third and fourth buffer memory means; and programming means responsive to said comparator means to control said second gate means to deliver an ignition signal when said second counter means has counted a first or a second predetermined number of pulses corresponding respectively to said large or to said small angular distance between two passages through an upper dead center according as the content of said fourth buffer memory means is less or greater than the content of said third buffer memory means.

8. Apparatus for use in controlling the ignition advance angle of a multi-piston internal combustion engine as a function of both the speed and loading of said engine: comprising speed pick-up means for delivering a pulse at each passage of a piston of said engine through a corresponding predetermined position to produce a plurality of successive pulses corresponding respectively to predetermined angular positions during each engine revolution; pulse shaper means for receiving said successive pulses and frequency divider means connected between said shaper means and first counter means for supplying thereto input pulses having a period equal to the period of said engine revolution; time base generation means for generating first and second clock signals having respective frequencies fixed in a predetermined ratio and for applying said second clock pulses to said first counter means to be counted during a counting period defined between two successive input pulses to produce a count representative of said engine speed; first buffer memory means for storing said number representative of said engine speed during the next counting period of said first counter means; first backward counter means for counting down said number stored in the first buffer means in synchronism with said first clock signal; first gate means for producing an output pulse at the end of each count down of said number by said first backward counter means and to apply an input pulse to said backward counter means for controlling a new count down of said number; first read only memory means programmed to store a digitized representation of an ignition advance angle portion ($\alpha$) /engine speed characteristic of said engine; said first read-only memory means connected to receive as input said number stored by said first buffer memory means and responsive thereto to produce an output number representative of the corresponding ignition advance angle portion ($\alpha$); second counter means operable under control of said input signals produced by said shaper means to receive said number produced by said first read-only memory means and then to receive and count said output pulses from said first gate means up to a predetermined count value representative of a first selected fraction of the angular distance separated consecutive passages of two pistons through said predetermined angular position; second gate means for delivering a signal when said second counter means has reached said predetermined count value; pressure pick-up means for producing a pulsed signal including a number of pulses representative of the loading of said engine; second buffer memory means for storing said pulses from said pressure pick-up means; second read-only memory means programmed to store a digitized representation of an ignition advance angle portion ($\beta$)/engine speed characteristic of said engine, such that the sum of said angles ($\alpha$) and ($\beta$) represents the total required ignition advance angle, said second read-only memory means connected to receive as input said number stored by said second buffer memory means and responsive thereto to produce an output number representative of the corresponding ignition advance angle portion ($\beta$); third counter means operable in response to pulses delivered by said shaping means to receive said output number produced by said read-only memory means and in response to the signal delivered by said second gate means to count, from said number with which it is loaded, pulses of said output signal delivered by said first gate means and gated by the second gate means up to a predetermined count value representative of a second selected fraction of said angular distance separating said consecutive passages of two pistons through said predetermined angular position, the sum of said first fraction and of said second fraction being equal to said angular distance; and third gate means connected to said third counter means for delivering an ignition signal when said third counter means has reached its predetermined count value.

* * * * *